Oct. 13, 1931.  W. G. FINCHER  1,827,427
CANOPY
Filed Aug. 23, 1929   2 Sheets-Sheet 1

INVENTOR
Walter G. Fincher
BY Arthur P. Brown
ATTORNEY

Oct. 13, 1931.   W. G. FINCHER   1,827,427
CANOPY
Filed Aug. 23, 1929   2 Sheets-Sheet 2
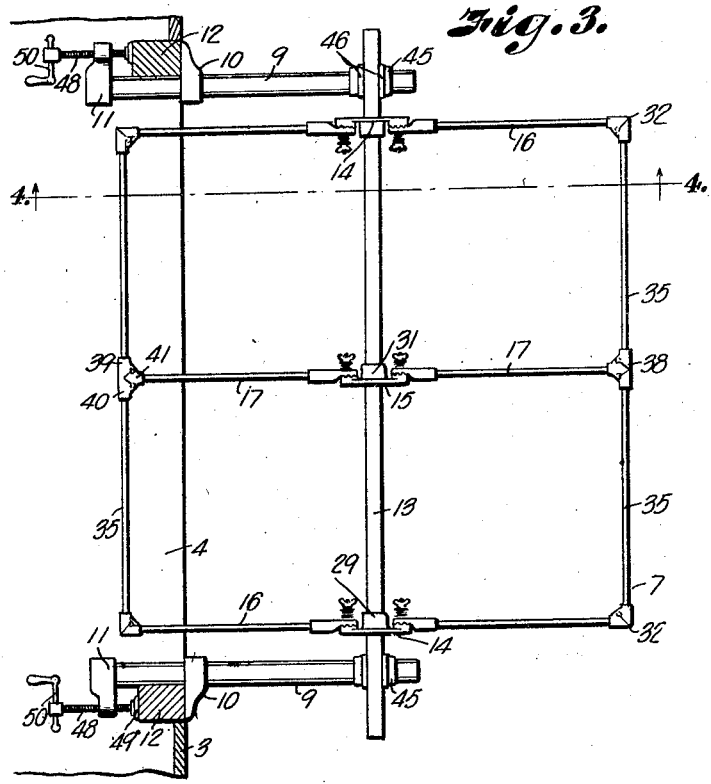
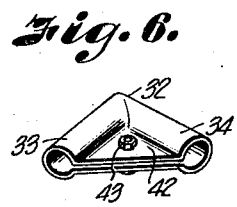
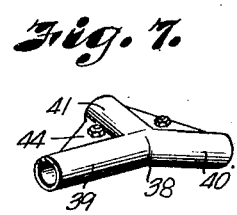
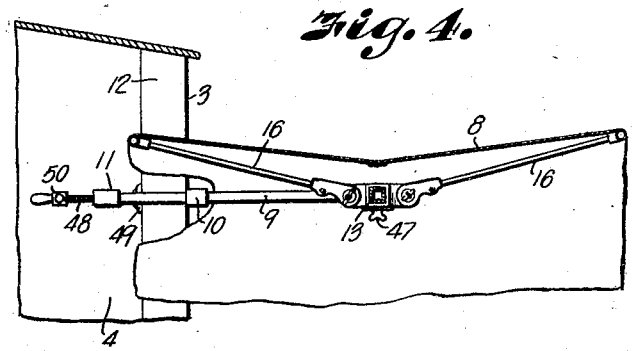
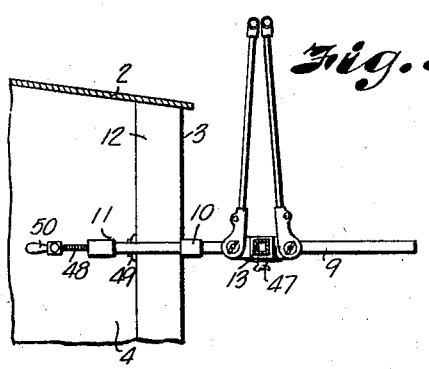
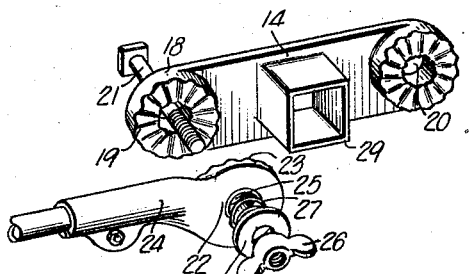
INVENTOR
Walter G. Fincher
BY Arthur C. Brown
ATTORNEY Patented Oct. 13, 1931

1,827,427

UNITED STATES PATENT OFFICE

WALTER G. FINCHER, OF KANSAS CITY, MISSOURI

CANOPY

Application filed August 23, 1929. Serial No. 387,953.

My invention relates to canopies and more particularly to collapsible canopies for sheltering a runway between a dock and a freight car door, the principal objects of the invention being to intercept water flowing from the dock and car roofs and discharge the same laterally of the runway, to support a canopy from the car, to provide for adjustment of a canopy to car doors of various dimensions, to enhance the stability of an adjustable collapsible canopy, and to facilitate the mounting and dismounting of a canopy.

In accomplishing these and other objects of the invention, I have provided improved details of structure, the preferred forms of which are illustrated in the accompanying drawings, wherein:

Fig. 3 is a plan view of the canopy in functioning position, the canvas cover being removed, and the supporting portion of the car being shown in section.

Fig. 4 is a vertical section on the line 4—4, Fig. 3.

Fig. 5 is a similar section illustrating the canopy in partly collapsed position preparatory to extending the same or removing it from the car door.

Fig. 6 is a perspective view of a corner elbow member for connecting portions of the canopy frame.

Fig. 7 is a perspective view of a center T illustrating adaptation thereof for effecting downward lateral divergence of frame members.

Fig. 8 is a perspective view of one of two socket members and a portion of an end frame member adapted to be connected thereto, partly disassembled.

Figure 1:
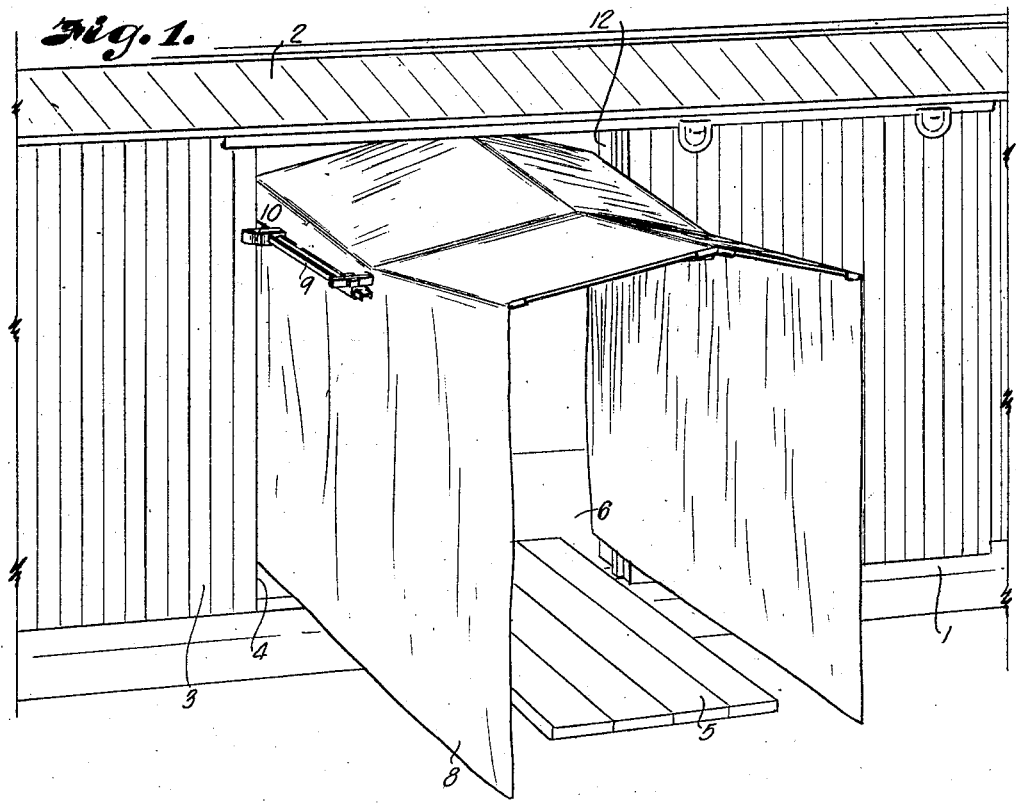
Fig. 1 is a perspective view of a portion of a freight car and my improved canopy mounted in the car door.
Figure 2:
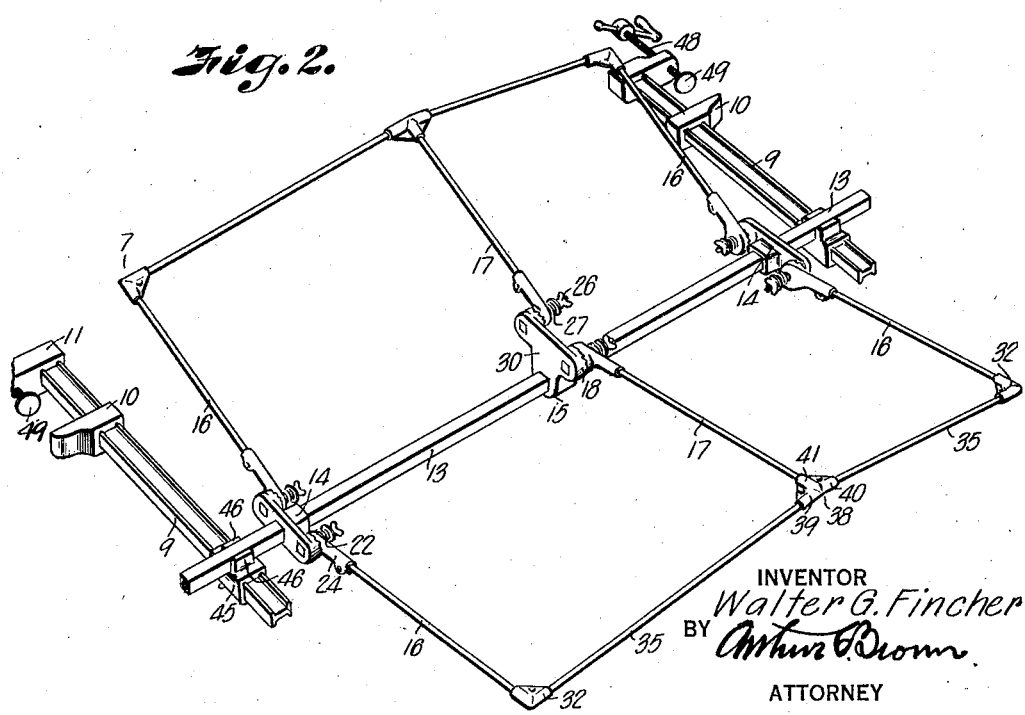
Fig. 2 is a perspective view of the skeleton structure of the canopy and clamps for attaching the canopy to car door posts, one of the clamp elements being shown fragmentarily.

Referring in detail to the drawings:

1 designates a freight car including a slanting roof 2 and a side wall 3 having a door opening 4.

In loading cars, a plank or platform 5 is laid on the floor 6 of the car and extends across the space between the car and a dock to form a runway over which loaders may move for transferring merchandise between the car and the dock.

The path over which the merchandise is moved is subject to weather and like effects. In order to shelter and protect the merchandise during movement thereof, I provide a canopy including a skeleton frame 7, a curtain 8, and clamping arms 9 provided with clamp members 10 and 11 for supporting the canopy from door posts 12 of the car.

The frame includes a relatively rigid, straight transverse center bar 13 preferably non-circular in cross section and which may comprise a square steel tube, end brackets 14 and a center bracket 15 having squared openings mounted on the tube, pairs of frame arms or bail-like rods 16 having inner ends pivotally connected with opposite ends of the end brackets and arms 17 connected with the center bracket as presently described for supporting the curtain and effecting extension and collapse of the canopy.

The end brackets 14 are provided with bosses 18 having ratchet-like radially grooved faces 19 and apertures 20 extending through the bosses to receive bolts or pivot pins 21. Disks 22 having ratchet faces 23 are attached by clamping sleeves 24 to the inner ends of related arms 16.

The bolts 21 extend through openings 25 in the disks to receive thumb nuts 26 for securing the arms to the brackets. Coil springs 27 mounted on the bolts bear inwardly against the disks and outwardly against washers 28 retained by the nuts for resiliently retaining abutting ratchets in latching engagement and permitting rotation of the disks over the bosses.

The bosses are formed on the inner faces of the brackets, and bearing collars 29 extend inwardly from the edges of the squared openings in the brackets to form reinforcing portions of the brackets for retaining the same in right angularly extending position on the tube.

The end brackets comprise straight bars having the bosses adjacent their ends, the axes of bosses and collar being on the center lines of the bars.

The center bracket 15 includes a similar straight bar having similar ratchet bosses for adjustably pivotally supporting the inner ends of frame rods 17, and additionally includes a wing 30 provided with a bearing collar 31 to receive the tube, whereby the ratchets thereof are supported in spaced relation with the bar and above the plane of the inner ends of the frame rods 16.

Mounted on the outer ends of the rods 16 are elbow members 32 having right angularly extending tubular branch portions 33 and 34 forming sockets to receive respectively the rods 16 and outer ends of transverse frame rods 35. The several rod-like members 16, 17 and 35 preferably comprise pipes.

Mounted on the outer ends of the rods 17 are center T's 38 having angularly related tubular branches 39 and 40 forming sockets to receive the inner ends of the rods 35, and tubular branches 41 to receive the outer ends of the rods 17 to complete the skeleton structure of the canopy.

The elbow branches comprise split tubes and are connected by webs 42 extending between edges defining the slits in the tubes, whereby the webs and tubes may be spread to admit the rod ends, and form clamps to retain the rods. Fastening means 43 comprising bolts mounted in the webs and nuts on the bolts are adapted to press the webs toward each other to contract the tubes for retaining the rods.

The T's are formed similarly to the elbows, of split tubular branches and webs 44 connecting the branches 39 and 40 with the branches 41, and being provided with bolts and nuts for effecting clamping of rod ends in the sockets.

Adjustably mounted on the outer end portions of the arms 9 are lug-like socket members 45 having upstanding spaced ears 46 forming slots to receive the bar 13. The arms 9 comprise I-beam-like bars having vertically extending flanges. The socket members 45 are hollow and provided with internal grooves to receive the flanges of the bars, whereby the socket members may be moved along the bars and will be retained thereon against rotation.

Set screws 47 mounted in the socket members are adapted to engage the bars for fixing the frame in adjusted position thereon.

The clamp members 10 are jaws slidably movable on the bars to engage the outer faces of door posts and adapted to be latched to the bars when pressure is exerted against their outer ends.

The members 11 include laterally projecting jaws fixed to the ends of the bars 13, and screws 48 threaded in the jaws and having heads 49 adapted to engage the inner faces of the door posts and operating in alignment with points on the post-engaging faces of the jaws 10. The screws have operating cranks 50 on their outer ends.

In assembling the frame, the center bracket is mounted on the bar and moved to a position spaced slightly from the center thereof to permit the rods 17 to extend on the central longitudinal line of the canopy. The end brackets are mounted on the tube in spaced relation with the ends thereof.

The rods 16 extending on one side of the frame are adapted to lie in a plane, and the rods 35 are adapted to extend angularly to said plane to assist in forming the canopy arch or peak and elevate the front and rear ends of the roof portion of the canopy above the center thereof. The elbows are therefore rotated on the rods 16 sufficiently to confer the desired inclination on the rods 35 before the elbows are clamped tightly to the rods.

The degree of inclination of the rods 35 is fixed by the value of the angle enclosed by the branches 39 and 40 of the center T's 38. The rods 17 are connected with the center bracket and center T's. The cover is then mounted on the frame, and suitably attached thereto to form a canopy roof and side curtains depending from the end rods 16.

The curtain may be provided with suitable apertures to receive the ends of the bar so that a single integral sheet of canvas may be employed as the covering member, the sheet being shaped to conform to the canopy frame.

The canopy may be collapsed and folded for storage by pivoting the opposite frame portions on the end and center brackets into substantially parallel relation, the hinging movement of the frame members effecting gathering of the depending curtain portions into relatively compact bundles at each end of the frame.

When the canopy is to be used, the arms 9 are mounted on car door posts and clamped thereto adjacent the top of the door to form supporting brackets. The canopy may then be mounted on the supports by moving the socket members 45 over the ends of the arms and therealong to the suitable position for locating the car end of the canopy within the car.

The canopy may be distended before or after mounting the frame on the supports. The position of the frame may be adjusted by sliding the socket members along the arms, and it may be fixed in position by the set screws in the socket members.

The canopy roof may be inclined downwardly from both ends toward the transverse center line by conferring suitable inclination on the end rods 16 and center rods 17. The roof will further be inclined downwardly laterally from its center longitudinal or ridge line, due to the inclination of the rods 35.

Water falling on the canopy roof or flowing thereto from car or dock roofs will flow toward the transverse center line of the roof, and away from the car door and dock, and will be discharged laterally from the inclined gutter-like central portion of the canopy roof.

What I claim and desire to secure by Letters Patent is:

1. In a device of the character described, a canopy frame comprising a bar, a plurality of brackets slidable on the bar having bearing portions spaced differentially from the axis thereof, and oppositely extending frame members pivotally supported by said bearing portions of the brackets.

2. In a device of the character described, a canopy frame comprising a bar, a plurality of brackets non-rotatably mounted on the bar having bearing portions in differentially spaced relation therewith, and oppositely extending frame members pivotally supported by said bearing portions.

3. In a device of the character described, a canopy frame comprising a bar, a plurality of brackets non-rotatably mounted on the bar including end brackets having bearing portions aligned with the axis of the bar and a center bracket having bearing portions spaced from the axis thereof, and oppositely extending frame members pivotally supported by the bearing portions of the brackets.

4. In a device of the character described a canopy frame comprising a rigid bar having a non-circular cross section, a plurality of brackets non-rotatably mounted on the bar including end brackets and a center bracket, each having ratchet-faced bosses at opposite ends, end rods pivotally supported by the end brackets and center rods pivotally supported by the center bracket, each rod having a ratchet portion engaging one of said bosses, elbows on the outer ends of the end rods, ties on the outer ends of the center rods having angularly extending socket branches, and rods having opposite ends mounted respectively in an elbow and a branch socket forming oppositely inclined outer edge portions of the frame.

5. In a device of the character described, a canopy frame comprising a bar, brackets adjacent opposite ends of the bar, end rods having pivotal mounting in the center lines of the brackets in alignment with the axis of the bar, a center bracket, means supporting the center bracket in spaced relation with the bar, center rods pivoted in the center line of the center bracket, and means connecting the outer ends of said rods.

6. In a device of the character described a canopy frame comprising a bar, brackets adjacent opposite ends of the bar, end rods having pivotal mounting in the center lines of the brackets in alignment with the axis of the bar, a center bracket, means supporting the center bracket in spaced relation with the bar, a center rod pivoted in the center line of the center bracket and means including a tie clamped to the center rod having angularly extending sockets for connecting the outer ends of the end rods.

7. In a canopy, a frame including a bar, a plurality of brackets mounted on said bar including a center bracket spaced vertically from said bar and side brackets aligned with said bar and canopy-supporting rods pivotally mounted on said brackets.

8. In a canopy, a frame including a bar, a plurality of brackets mounted on the bar including a center bracket spaced a greater distance from the axis of the bar than adjacent brackets, rods including a center rod pivotally mounted on said brackets, and means including a tie clamped to said center rod having angularly extending sockets for connecting the outer ends of rods mounted on said adjacent brackets.

9. A canopy including a roof inclined downwardly toward the longitudinal edges thereof and inclined downwardly inwardly from the end edges thereof.

In testimony wherof I affix my signature.

WALTER G. FINCHER.